United States Patent
Smith et al.

(10) Patent No.: US 10,233,686 B2
(45) Date of Patent: Mar. 19, 2019

(54) SYSTEM AND METHOD OF CONTROLLING A VEHICLE WINDOW ASSEMBLY

(71) Applicant: GM GLOBAL TECHNOLOGY OPERATIONS LLC, Detroit, MI (US)

(72) Inventors: Alex J. Smith, Madison Heights, MI (US); Terrence P. Costigan, Fenton, MI (US); Mark W. Vanden Berg, Macomb, MI (US); Charles J. Bongiorno, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 142 days.

(21) Appl. No.: 15/297,676

(22) Filed: Oct. 19, 2016

(65) Prior Publication Data
US 2018/0106091 A1    Apr. 19, 2018

(51) Int. Cl.
*E05F 15/00*   (2015.01)
*E05F 15/695*   (2015.01)
*B60J 1/17*   (2006.01)
*E05F 15/71*   (2015.01)
*E05F 15/77*   (2015.01)

(52) U.S. Cl.
CPC ............... *E05F 15/695* (2015.01); *B60J 1/17* (2013.01); *E05F 15/71* (2015.01); *E05F 15/77* (2015.01); *E05Y 2201/434* (2013.01); *E05Y 2400/36* (2013.01); *E05Y 2400/40* (2013.01); *E05Y 2400/854* (2013.01); *E05Y 2900/55* (2013.01)

(58) Field of Classification Search
CPC . E05F 15/695; E05F 15/71; B60J 1/17; E05Y 2201/434; E05Y 2400/40; E05Y 2400/854; E05Y 2400/36; E05Y 2900/55

USPC .................................................. 49/138, 25
See application file for complete search history.

(56) References Cited

U.S. PATENT DOCUMENTS

| | | | | |
|---|---|---|---|---|
| 4,998,379 A * | 3/1991 | Yamada | ............... | E05F 11/445 49/138 |
| 5,085,004 A * | 2/1992 | Beauprez | ............. | E05F 11/445 49/138 |
| 5,142,824 A * | 9/1992 | Le Compagnon | ......... | B60J 1/17 49/138 |
| 6,114,820 A * | 9/2000 | Nishigaya | ............. | E05F 15/697 160/292 |
| 6,366,042 B1 * | 4/2002 | Gerbetz | ............... | H02H 7/0851 318/266 |
| 6,434,885 B1 * | 8/2002 | Hill | ......................... | B60J 10/75 318/268 |

(Continued)

*Primary Examiner* — Jerry E Redman
(74) *Attorney, Agent, or Firm* — Quinn IP Law

(57) ABSTRACT

A system and method for controlling movement of a window in a vehicle door assembly h includes a window actuator operable to move a window relative to a window opening in the door between a first position and at least one second position. The controller is configured monitor the position of the window relative to the window frame and transmit at least one control signal to the window actuator to move the window relative to the window opening in response to activation of the one or more devices. The controller transmits a first control signal to the window actuator to move the window at a first speed in response to detection of a first activation state and a second control signal to the window actuator to move the window at a second speed that is reduced relative to the first speed in response to detection of a second activation state.

15 Claims, 2 Drawing Sheets

(56) References Cited

U.S. PATENT DOCUMENTS

| | | | | |
|---|---|---|---|---|
| 6,530,175 B2* | 3/2003 | Sato | ........ | E05F 11/445 |
| | | | | 475/170 |
| 7,578,094 B2* | 8/2009 | Rogers | ........ | E05F 15/63 |
| | | | | 296/146.8 |
| 8,418,405 B2* | 4/2013 | Yoshida | ........ | E05F 11/445 |
| | | | | 49/348 |
| 8,827,027 B2* | 9/2014 | Syvret | ........ | E05F 15/70 |
| | | | | 180/271 |
| 9,193,248 B2* | 11/2015 | Kalliomaki | ........ | B60J 7/043 |
| 2009/0021190 A1* | 1/2009 | Shibata | ........ | E05F 15/695 |
| | | | | 318/14 |
| 2011/0023368 A1* | 2/2011 | Mizutani | ........ | E05F 11/445 |
| | | | | 49/349 |
| 2017/0260795 A1* | 9/2017 | Jergess | ........ | E05F 15/632 |
| 2017/0361685 A1* | 12/2017 | Schwarz | ........ | E05F 15/60 |

* cited by examiner

SYSTEM AND METHOD OF CONTROLLING A VEHICLE WINDOW ASSEMBLY

INTRODUCTION

The present invention relates to a system and method of controlling movement of a window assembly in a vehicle door assembly.

Vehicles include at least one door for access to the vehicle interior and at least one window to permit passage of light into an interior of the vehicle. Such a window may be covered with a glass panel that is selectively movable between an open position and a closed position. In the closed position, the window completely obstructs a window opening. In the open position, at least part of the window opening is unobstructed to allow entry of ambient air into the vehicle interior.

A vehicle may also be equipped with power windows, power doors, power liftgates, and other automatically openable and closable closure panels. Certain power windows are referred to as "express up" windows. These windows are raised by a motor in response to activation of a switch. The switch can be released after an initial actuation and the window will continue to rise to close a window opening. These systems may be configured to stop power to the motor and reverse the direction of travel of the window if the window contacts an obstacle in the path of window travel during the closure.

SUMMARY

A vehicle having a body defining a vehicle interior includes at least one door assembly attached to and movable relative to the body to provide access to the vehicle interior. The at least one door assembly includes a window opening defined therein and cooperates with at least one window assembly having a window movable relative to the window opening.

The window assembly includes a window actuator operable to move the window relative to the window opening between a first position and at least one second position. One or more devices are operatively connected to the window actuator and a controller. The controller is configured to detect the position of the window relative to the window opening and transmit at least one control signal to the window actuator to cause the window to move relative to the window opening in response to activation of the one or more devices and the position of the window relative to the window frame. The controller transmits a first control signal to the window actuator to move the window at a first speed in response to detection of a first activation state and transmits a second control signal to the window actuator to move the window at a second speed that is reduced relative to the first speed in response to detection of a second activation state.

The window actuator includes a power source and a motor operatively connected to the window and to the power source, wherein the motor is configured to move the window relative to the window opening in response to the first and second control signals from the controller. The power source reduces power to the motor in response to receiving the second control signal from the controller to apply the second speed for movement of the window relative to the window opening. The at least one door assembly includes a door structure including an inner panel and an outer panel, wherein the inner panel and the outer panel cooperate to define a door cavity receiving the at least one window assembly and a window frame defining the window opening.

The one or more devices include one or more switches disposed on the inner panel of the door structure in electrical communication with the controller and window actuator. The first activation state is generated in response to activation of the one or more switches. The one or more devices includes one or more remote input devices or one or more sensors in electrical communication with the controller and window actuator. The second activation state is generated in response to activation of the one or more remote input devices or one or more sensors.

A method of controlling movement of a window relative to a window opening in a vehicle door assembly includes providing a window actuator operable to move the window relative to the window opening between a first position and at least one second position. A controller detects the position of the window relative to the window frame and monitors one or more devices and detects an activation state of one or more devices operatively connected to the window actuator. The controller transmits at least one control signal to the window actuator to move the window relative to the window opening in response to the activation state of the one or more devices. The controller transmits a first control signal to the window actuator to move the window at a first speed in response to detection of a first activation state and transmits a second control signal to the window actuator to move the window at a second speed that is reduced relative to the first speed in response to detection of a second activation state.

The window actuator includes a power source and a motor operatively connected to the window such that the power source reduces power to the motor in response to detection of the second activation state by the controller to apply the second speed for movement of the window relative to the window opening. The vehicle door assembly includes a door structure having an inner panel and an outer panel. One or more switches are disposed on the inner panel of the door structure and are in electrical communication with the controller and window actuator. The first activation state is generated in response to activation of the one or more switches. One or more remote input devices are in electrical communication with the controller and window actuator. A second activation state is generated in response to activation of the one or more remote input devices.

The above features and other features and advantages of the present invention are readily apparent from the following detailed description of the best modes for carrying out the invention when taken in connection with the accompanying drawings.

DETAILED DESCRIPTION

Figure 1:
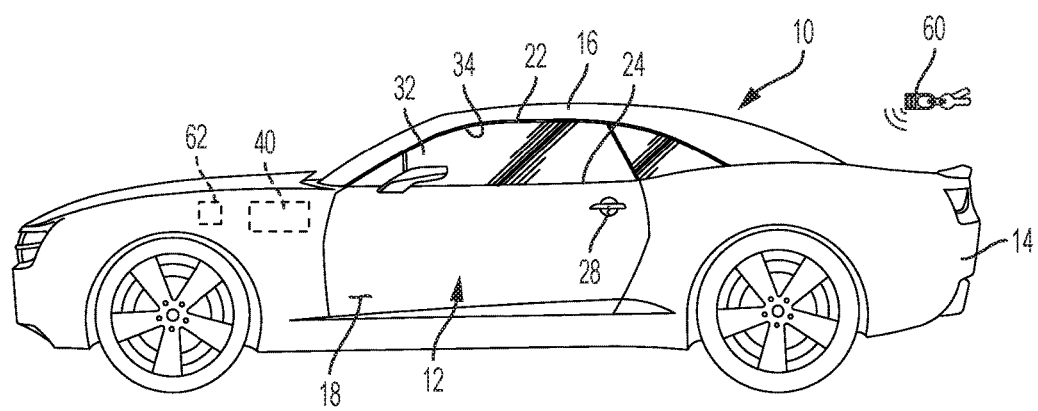
FIG. 1 is a schematic illustration of a side view of vehicle having a door assembly movably secured thereto.

Reference will now be made in detail to several embodiments of the disclosure that are illustrated in the accompanying drawings. Whenever possible, the same or similar reference numerals are used in the drawings and the description to refer to the same or like parts or steps. The drawings are in simplified form and are not to precise scale. For purposes of convenience and clarity, directional terms such as top, bottom, left, right, up, over, above, below, beneath, rear, and front, may be used with respect to the drawings. These and similar directional terms are not to be construed to limit the scope of the disclosure in any manner. The elements shown in the Figures are not to scale or proportion. Accordingly, the particular dimensions and applications provided in the drawings presented herein are not to be considered limiting.

Referring to the drawings, wherein like reference numbers correspond to like or similar components throughout the several Figures, a vehicle 10 is shown schematically in FIG. 1. The vehicle 10 may be a mobile platform, including a motorized vehicle, such as, but not limited to, standard passenger cars, sport utility vehicles, light trucks, heavy duty vehicles, minivans, buses, transit vehicles, trains, airplanes, bicycles, robots, farm implements, sports-related equipment or other transportation device.

FIG. 1 shows the vehicle 10 configured with at least one door assembly or door 12 operatively connected to and disposed proximate an opening in a vehicle body 14 and a roof portion 16. The vehicle body 14 and roof portion 16 cooperate to define a vehicle interior. The door 12 includes an outer panel 18 that defines the exterior surface of the door 12. The outer panel 18 cooperates with an inner panel (shown as 20 in FIG. 2) to define a door frame 22. As is also shown in FIG. 3, the door frame 22 and the belt line 24 of the door 12 define a window opening 26 therebetween. The door 12 further includes an exterior or outside door handle 28, which is moveable to actuate a door latch to release the door 12 from a closed position wherein the door is at least partially disposed adjacent the opening in the vehicle body 14 to a fully opened position and to any intermediate position therebetween, for example, to a position where the door is slightly ajar or is partially opened.

The outer panel 18 and inner panel 20 cooperate to define a door cavity therebetween that is disposed below the belt line 24. At least one window assembly 30 cooperates with door 12 and is disposed in the door cavity and includes a window 32 supported on a track (not shown) between outer panel 18 and inner panel 20 of the door for movement between a first and at least one second position. As shown in FIG. 3, the perimeter of the sealing edge 36 of the window 32 abuts the sealing interface 34 or weather seal that is secured to the door 12 around an edge of a window opening 26 defined by the door frame 22 when the window 32 is placed in a fully closed position. Although the sealing interface 34 shown in FIG. 3 is attached to the door frame 24, the sealing interface 34 may alternatively be attached to the vehicle body 14 or a roof portion 16 as is shown in FIG. 1.

In one non-limiting example, the roof portion 16 may be configured as one of a hard top or a convertible top. It is contemplated that door 12 may include a frameless window 32 which seals directly to a sealing interface 34 defined by the roof portion 16. The sealing interface 34 may be configured as a seal which may extend along the perimeter of the roof portion 16 adjacent to a sealing edge 36 of the window 16. The sealing edge 36 of the window 32 may be moved into the sealing interface 34 of the roof portion 16 in a fully closed position shown in FIG. 1 to provide a seal to prevent wind noise, ingress of air, dust and rain, and to resist outward pressure of the window due to the pressure differential between the inside and outside of the vehicle at high speeds.

The vehicle 10 further includes a controller 40, which may be, by way of non-limiting example, a body control module or a door control module. The controller 40 may be configured to transmit and receive signals, to process information and provide commands to systems and components to which the controller 40 is operatively connected or in communication. The controller 40, as provided herein, may be operatively connected to or in communication with, the window assembly, one or more devices, a door latch, a window regulating mechanism, a door lock mechanism, and various sensors and switches associated therewith.

Figure 2:
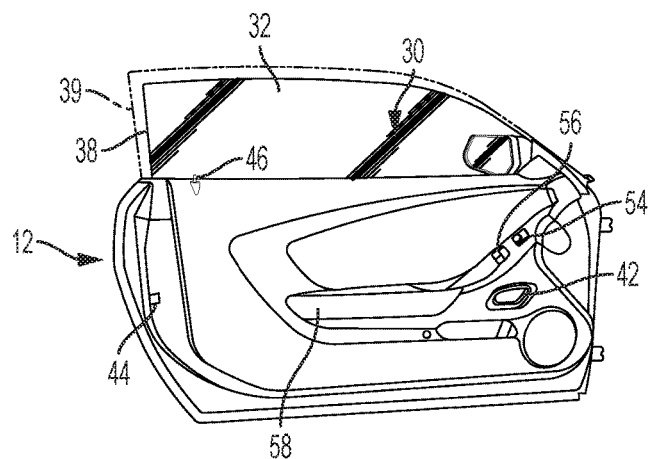
FIG. 2 is a schematic illustration of a side view of the interior surface of the door assembly of the vehicle.
Figure 3:
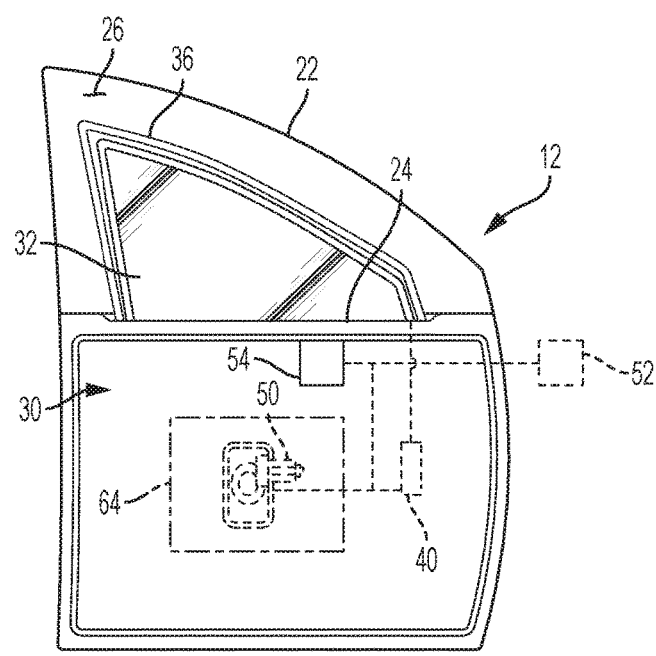
FIG. 3 is a schematic illustration in side view of a vehicle door assembly for controlling movement of a window assembly.

FIG. 2 illustrates the door 12 as viewed from an interior area of the vehicle 10. The window is shown in a phantom lines in a first position as referenced by numeral 39 and in at least one second position in solid lines by reference numeral 38. The door 12 includes an interior or inside door handle 42, which is movable to actuate a door latch mechanism or door latch 44 to release the door 12 from a closed position, such that the door is movable from the closed position to a fully opened position and to any intermediate position therebetween, for example, to a position where the door is slightly ajar or is partially opened. The door 12 further includes a door lock mechanism 46, which is configured to selectively lock the latch 44 such that when the door lock mechanism 46 is engaged or in a locked condition, the latch 44 is prevented from being disengaged or unlatched.

For example, the door lock mechanism 46 may be engaged or disengaged from the interior of the vehicle 10 using a door lock switch located on a surface of the inner panel 20 of the door 12 such as the armrest and/or using a keyless actuator, such as a remote key fob. The door lock mechanism 46 may be in operative communication with the controller 40, such that the controller 40 may receive signals from and send signals to the door lock mechanism 46, including signals indicating the status of the door lock mechanism 46 and signals commanding the door lock mechanism 46 to engage or disengage the door lock. The door latch 44 is operatively attached to an interior portion of the door 12 and is configured with an opening accessible from the exterior of the door 12 through which a striker or other engageable component is introduced to the door latch 44 when the door 12 is in a closed position.

Referring now to FIG. 3, the window assembly 30 of door 12 may be a power window assembly. Window assembly 30 may include a window actuator 48 operable to move the window 32 relative to the window opening 26 between the first position and the at least one second position. In one embodiment, window actuator 48 includes a motor 50 powered by a power source 52 to raise and lower the window 32 between the first position and the at least one second positions. In one embodiment, the power source 52 may be a vehicle battery located in a vehicle engine compartment and connected to the door 12 by electrical wiring. It is also contemplated that the controller 40 monitors the window actuator 48 to detect the position of the window 32 relative to the window opening 26 and transmit the position to the controller 40. The motor 50 may be operated at variable speeds and may be configured to reverse the direction of travel in response to encountering or detecting the presence of an object with an electromechanical obstacle detection system or the like.

One or more input devices or devices 54 are operatively connected to the window actuator 48 and/or the control 40.

The one or more devices 54 may include one or more switches with a window up position and a window down position that may or may not be located on the door assembly 12. In one embodiment, the one or more devices 54 may include one or more switches 56 on the inner panel 20 of the door 12. When actuated or engaged, the one or more switches 56 are activated and communicate a first activation state to the controller 40.

The inner panel 20 of the door 12 includes an armrest 58 receiving one or more actuators or switches 56. Switches 56 allow the vehicle occupant to control one or more functions of the vehicle, such as a window actuator that allows the operator to move the window 32 between the first position and the at least one second position. In other embodiments, the switches 56 may provide other vehicle functionality, such as the locking and unlocking of the door 12, turn on a vehicle light, allow adjustment of a mirror or control an entertainment system. It should be appreciated that while embodiments herein may refer to a window control switch 56, this is for exemplary purposes and not intended to limit the disclosure.

Alternatively, the one or more devices 54 may be located at some other location in the vehicle 10, or, as shown in FIG. 1, may be a remote input device 60, as may be contemplated in the use of a wireless transmitter, key fob, mobile communication device or the like. When engaged, the one or more remote input devices 60 is activated and communicates a second activation state to the controller 40.

It is also contemplated that the one or more devices 54 may also include one or more sensors 62 on the vehicle 10 in communication with the controller 40 as shown in FIG. 1. In one non-limiting example, the one or more sensors 62 may include a rain-sensing sensor or module that is in electrical communication with the controller 40. The rain-sensing sensor 62 may transmit an autonomous request for action to the controller 40 to instruct the window actuator 48 to adjust the window 32 from the first position to the at least one second position in response to the detection of condensation.

In response to detection of a first and/or second activation state, the controller 40 may subsequently establish electrical power flow from the power source 52 to the motor 50 to raise and lower the window 32 between the first position and the at least one second position. It is contemplated that the controller 40 generates at least one control signal to instruct the variable adjustment of speed produced by the motor 50 based upon a number of factors, including, but not limited to, the position of the window 32 in the window opening 26, the source of the change of the activation state of the at least one device 54 and the like.

In one non-limiting example, the controller 40 may detect a first activation state generated by activation of the one or more switches 56 from the interior of the vehicle 10. The controller 40, in response to detection of the first activation state, may determine the position of the window 32 relative to the window opening 26. The controller 40 monitors the position of the window 32 prior to movement as well as during travel of the window 32 relative to the window opening 26.

Based upon the first activation state and window position, the controller 40 will generate and transmit a first control signal with at least one adjustment speed for use by the motor 50 to adjust the position of the window 32. For example, the controller 40 may instruct the motor 50 with a first control signal to adjust the window 32 at a first speed to move the window 32 between the first and the at least one second positions and instruct the motor 50 to adjust the window 32 at a second speed as the window 32 approaches a portion of the window opening 26 adjacent the belt line 24 or door frame 22.

In another non-limiting example, the controller 40 may detect a second activation state generated by activation of the remote input device 60 and/or the one or more sensors 62. The controller 40, in response to detection of the second activation state, may determine the position of the window 32 relative to the window opening 26. Based upon the second activation state and window position, the controller 40 will generate and transmit a second control signal with at least one adjustment speed for use by the motor 50 to adjust the position of the window 32.

The second control signal instructs adjustment of the window 32 at a speed, such as the second speed described above, which may be a reduced speed relative to the first speed in response to the autonomous or automatic activation of the remote input device 60 and one or more sensors 62 as compared to the first speed used for manual activation of the one or more switches 56 by a passenger of the vehicle 10. It is also appreciated that the variable speed parameters instructed to the motor 50 by the controller 40 may vary based upon the position of the window 32 relative to the window opening 26.

The window assembly 30 may additionally include a window indexing mechanism, generally referenced by reference numeral 64. The window indexing mechanism 64, which may also be referred to as a glass indexing mechanism, a window regulator, or a window regulator assembly, may be of any configuration suitable to move the window 32 between the first position and one or more second positions. The window indexing mechanism 64 may be configured as one of an arm and sector, scissors-type, cable-type, flexible axis, rope wheel, double-lift, or rail and cable window regulator assembly. Motor 50, which may be referred to as an indexing motor or an indexing actuator, cooperates with the window indexing mechanism 64 and may be configured, for example, as a window lift motor and may be in operative communication with one or more devices 54 and in operative communication with the controller 40.

Figure 4:
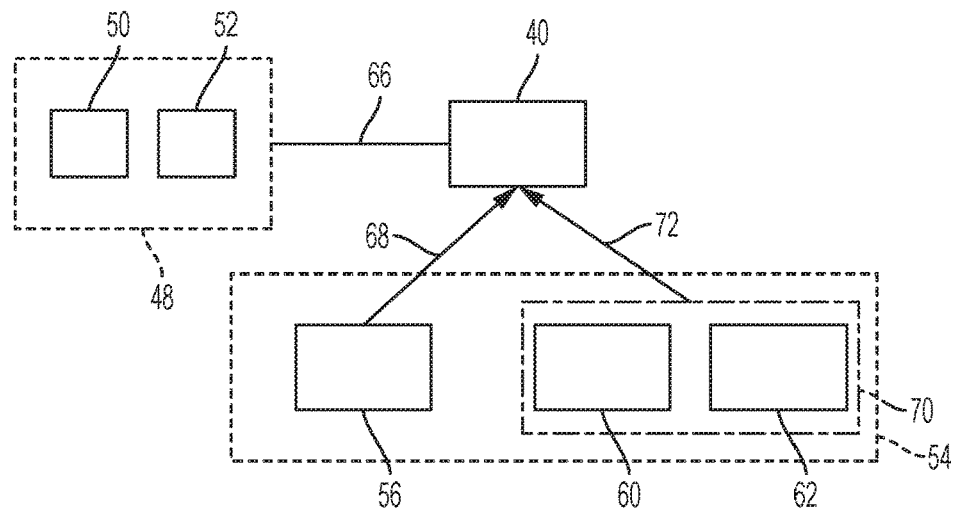
FIG. 4 is a functional block diagram of the system for controlling movement of the window assembly that may be used in connection with the vehicle of FIG. 1.

Referring now to FIG. 4, the controller 40 is operatively connected to the window actuator 48 and the one or more devices 54. The controller 40 monitors the one or more devices 54 and detects activation of the one or more devices 54. The controller 40 is configured to transmit at least one control signal as referenced by line and reference numeral 66 to the window actuator 48 to establish electrical power flow from the power source 52 to the motor 50 to raise and lower the window relative to the window opening in response to detection of an activation state of the one or more devices 54.

In one embodiment, the controller 40 monitors the position of the window 32 relative to the window opening 26 and each of the one or more devices 54, including the one or more switches 56, one or more remote input devices 60 and the one or more sensors 62, to detect an activation state of the one or more devices 54. The controller 40 transmits a first control signal, as generally represented by line and reference numeral 68, to the window actuator 48 in response to detection of activation or a first activation state of the switches 56 and position of the window 32 relative to the window opening 26. The first control signal 68 instructs the window actuator 48 to move the window at a first speed between a first position and at least one second position.

The one or more remote input devices 60 and one or more sensors 62 may be monitored by the controller 40 as a device group generally referenced by numeral 70. The controller 40 transmits a second control signal, as generally represented by line and reference numeral 72, to the window actuator 48 in response to detection of activation or a second activation state of the one or more remote input devices 60 and/or one or more sensors 62 of the remote device group 70 and the position of the window 32 relative to the window opening 26. The second control signal 72 instructs the window actuator 48 to move the window at a second speed that is reduced relative to the first speed as described above in response to detection of a second activation state of the one or more group of devices 70.

Figure 5:
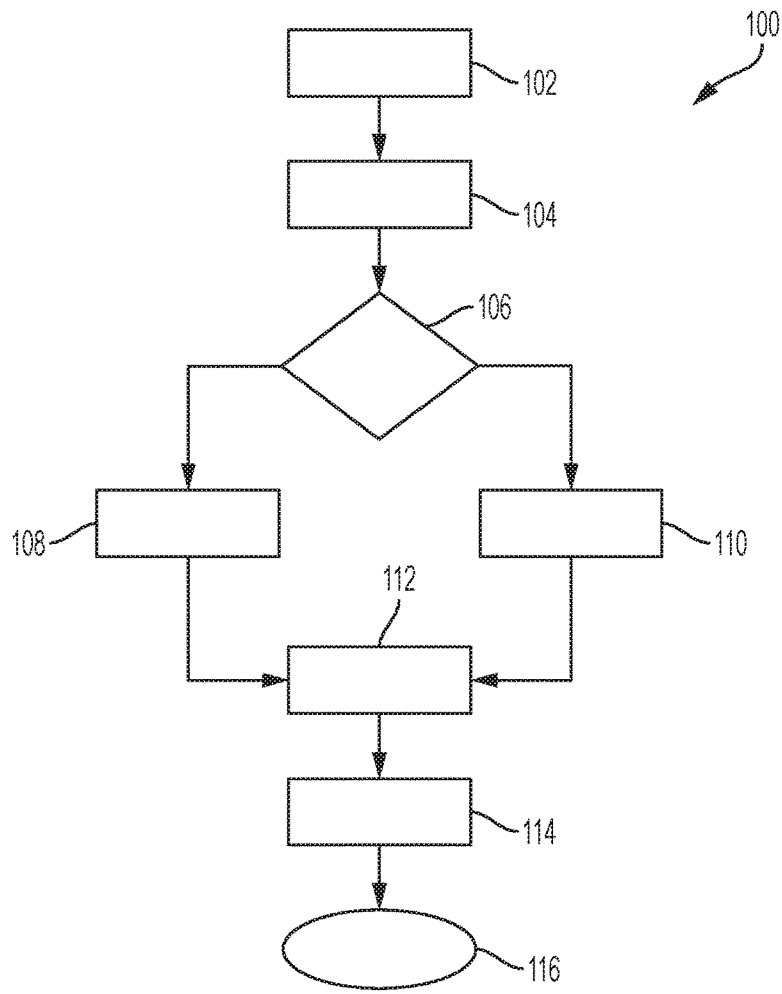
FIG. 5 is a flowchart of a method for controlling movement of the window assembly for a vehicle door assembly in accordance with the present disclosure.

Referring now to FIG. 5, a method for controlling the movement of a window relative to a window opening in a vehicle door assembly is described in greater detail. The method, generally referenced by numeral 100, starts at box 102. A window actuator of a window assembly including a window is provided on and cooperates with the vehicle door assembly. The window actuator is operable to move the window relative to a window opening of the vehicle door assembly between a first position and at least one second position.

At box 104, a controller is operatively connected to and monitors the position of the window relative to the window opening and one or more devices, including, but not limited to, one or more switches disposed on an interior portion of the vehicle such as the inner door panel of the door assembly, a remote input device and/or one or more vehicle sensors. It is contemplated that the controller monitors the position of the window relative to the window opening before activation of the one or more devices as well as during travel of the window relative to the window opening.

At box 106, the controller detects a change in an activation state of the one or more devices. The controller determines the source of the actuator state change request. If the controller detects a change in the activation state of the one or more switches, generally referred to as a change in a first activation state, the controller transmits a first control signal to the window actuator at box 108 to move the window relative to the window opening in the vehicle door assembly at a first speed between a first position and at least one second position It is understood that the controller may instruct the motor to adjust the window at variable speeds. For example, the controller may instruct the motor to adjust the window at a first speed between the first and at least one second positions then instruct the motor to adjust at a second speed as the window approaches a portion of the window opening adjacent the belt line or door frame.

If the controller detects a change in the activation state of the one or more remote input devices and/or one or more sensors, generally referred to as a change in a second activation state, the controller transmits a second control signal to the window actuator at box 110 to move the window relative to the window opening in the vehicle door assembly. The controller instructs the motor to adjust the window at a speed that is reduced relative to the first speed as described above between the first position and at least one second position.

At box 112, the window actuator receives the first or second control signal from the controller. Upon receipt, the window actuator moves the window relative to the window opening in the vehicle door assembly at the selected first speed or the at least one second speed between the first position whereby the window obstructs the window opening and at least one second position to at least partially exposes the window opening.

At box 114, the controller monitors the position of the window relative to the window opening and adjusts the speed of travel of the window from the first speed to the at least one reduced second speed when the window is disposed proximate a portion of the window opening. It is contemplated that the speed of travel of the window may be reduced as the window approaches one or more portions of the window opening to increase the degree of control over the movement of the window in the window opening. The method of controlling the adjustment of the window assembly in the door assembly ends at box 116.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
   a body defining a vehicle interior;
   at least one door assembly attached to and movable relative to the body to provide access to the vehicle interior, the at least one door assembly including a window opening defined therein;
   at least one window assembly cooperating with the at least one door assembly and having a window movable relative to the window opening;
   a window actuator operable to move the window relative to the window opening between a first position and at least one second position;
   a controller operatively connected to the window actuator, wherein the controller is configured to detect a position of the window relative to the window opening and transmit at least one control signal to the window actuator to cause the window to move relative to the window opening;
   one or more devices disposed in the vehicle and in electrical communication with controller and the window actuator, wherein the one or more devices disposed in the vehicle are actuated to communicate a first activation state to the controller causing the controller to transmit a first control signal to the window actuator to cause the window to move relative to the window opening and window frame a first speed; and
   one or more remote input devices in electrical communication with the controller, wherein the one or more remote input devices are actuated to communicate a second activation state to the controller,
   wherein the controller transmits a second control signal to the window actuator to move the window at a second speed in response to detection of the second activation state from the one or more remote input devices, wherein the second speed of movement of the window by the window actuator is reduced relative to the first speed of movement of the window by the window actuator in response to detection of the first activation state from the one or more devices.

2. The vehicle of claim 1 wherein the window actuator further comprises a power source and a motor operatively connected to the window and to the power source, wherein the motor of the window actuator is configured to move the window relative to the window opening between at least the first speed and the second speed in response to the first control signal and the second control signal from the controller.

3. The vehicle of claim 2 wherein the controller instructs the power source to reduce power to the motor in response to receiving the second control signal from the controller to apply the second speed for movement of the window relative to the window opening.

4. The vehicle of claim 1 wherein the at least one door assembly further comprises a door structure including an inner panel configured to receive the one or more devices and an outer panel cooperating with the inner panel to define a door cavity receiving the at least one window assembly and a window frame defining the window opening, wherein the one or more devices further comprise one or more switches disposed on the inner panel of the door structure in electrical communication with the controller and window actuator.

5. The vehicle of claim 1 further comprising one or more condensation sensors, wherein the one or more condensation sensors detect condensation adjacent the window of the vehicle and communicate the second activation state to the controller, wherein the controller transmits the second control signal to the window actuator to move the window at a second speed in response to detection of the second activation state from the one or more condensation sensors, wherein the second speed of movement of the window by the window actuator is reduced relative to the first speed of movement of the window by the window actuator in response to detection of the first activation state from the one or more devices.

6. The door assembly of claim 1 further comprising one or more condensation sensors, wherein the one or more condensation sensors detect condensation adjacent the window of the vehicle and communicate the second activation state to the controller, wherein the controller transmits the second control signal to the window actuator to move the window at a second speed in response to detection of the second activation state from the one or more condensation sensors, wherein the second speed of movement of the window by the window actuator is reduced relative to the first speed of movement of the window by the window actuator in response to detection of the first activation state from the one or more devices.

7. A vehicle door assembly comprising:
at least one window assembly having a window movable relative to a window opening in the door assembly;
a window actuator operable to move the window relative to the window opening between a first position and at least one second position;
a controller operatively connected to the window actuator, wherein the controller is configured to detect a position of the window relative to the window opening and transmit at least one control signal to the window actuator to cause the window to move relative to the window opening;
one or more devices disposed in the door assembly and in electrical communication with controller and the window actuator, wherein the one or more devices disposed in the door assembly are actuated to communicate a first activation state to the controller causing the controller to transmit a first control signal to the window actuator to cause the window to move relative to the window opening and window frame a first speed; and
one or more remote input devices in electrical communication with the controller, wherein the one or more remote input devices are actuated to communicate a second activation state to the controller,
wherein the controller transmits a second control signal to the window actuator to move the window at a second speed in response to detection of the second activation state from the one or more remote input devices, wherein the second speed of movement of the window by the window actuator is reduced relative to the first speed of movement of the window by the window actuator in response to detection of the first activation state from the one or more devices.

8. The door assembly of claim 7 wherein the window actuator further comprises a power source and a motor operatively connected to the window and to the power source, wherein the motor of the window actuator is configured to move the window relative to the window opening between at least the first speed and the second speed in response to the first control signal and the second control signal from the controller.

9. The door assembly of claim 8 wherein the controller instructs the power source to reduce power to the motor in response to detection of the second activation state to apply the second speed for movement of the window relative to the window opening.

10. The door assembly of claim 7 wherein the at least one door assembly further comprises a door structure including an inner panel configured to receive the one or more devices and an outer panel cooperating with the inner panel to define a door cavity receiving the at least one window assembly and a window frame defining the window opening, wherein the one or more devices further comprise one or more switches disposed on the inner panel of the door structure in electrical communication with the controller and window actuator.

11. A vehicle door assembly comprising:
at least one window assembly having a window movable relative to a window opening in the door assembly;
a window actuator operable to move the window relative to the window opening between a first position and at least one second position;
a controller operatively connected to the window actuator, wherein the controller is configured to detect a position of the window relative to the window opening and transmit at least one control signal to the window actuator to cause the window to move relative to the window opening;
one or more devices disposed in the vehicle and in electrical communication with controller and the window actuator, wherein the one or more devices disposed in the vehicle are actuated to communicate a first activation state to the controller causing the controller to transmit a first control signal to the window actuator to cause the window to move relative to the window opening and window frame a first speed; and
one or more condensation sensors, wherein the one or more condensation sensors detect condensation adjacent the window of the vehicle and communicate a second activation state to the controller,
wherein the controller transmits a second control signal to the window actuator to move the window at a second speed in response to detection of the second activation state from the one or more condensation sensors, wherein the second speed of movement of the window by the window actuator is reduced relative to the first speed of movement of the window by the window actuator in response to detection of the first activation state from the one or more devices.

12. The door assembly of claim 11 wherein the window actuator further comprises a power source and a motor operatively connected to the window and to the power source, wherein the motor of the window actuator is configured to move the window relative to the window opening between at least the first speed and the second speed in response to the first control signal and the second control signal from the controller.

13. The door assembly of claim 12 wherein the controller instructs the power source to reduce power to the motor in response to detection of the second activation state to apply the second speed for movement of the window relative to the window opening.

14. The door assembly of claim 11 wherein the at least one door assembly further comprises a door structure including an inner panel configured to receive the one or more devices and an outer panel cooperating with the inner panel to define a door cavity receiving the at least one window assembly and a window frame defining the window opening, wherein the one or more devices further comprise one or more switches disposed on the inner panel of the door structure in electrical communication with the controller and window actuator.

15. The door assembly of claim 11 further comprising one or more remote input devices in electrical communication with the controller, wherein the one or more remote input devices are actuated to communicate the second activation state to the controller, wherein the controller transmits the second control signal to the window actuator to move the window at a second speed in response to detection of the second activation state from the one or more remote input devices, wherein the second speed of movement of the window by the window actuator is reduced relative to the first speed of movement of the window by the window actuator in response to detection of the first activation state from the one or more devices.

* * * * *